(12) United States Patent
Strauss et al.

(10) Patent No.: US 7,549,939 B2
(45) Date of Patent: Jun. 23, 2009

(54) CONTINUOUSLY VARIABLE TRANSMISSION

(75) Inventors: Henning Strauss, Uetze (DE); Bernd-Guido Schulze, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 431 days.

(21) Appl. No.: 11/528,875

(22) Filed: Sep. 28, 2006

(65) Prior Publication Data
US 2007/0149335 A1   Jun. 28, 2007

(30) Foreign Application Priority Data
Sep. 28, 2005   (DE) ................ 10 2005 046 531

(51) Int. Cl.
*F16H 3/72* (2006.01)
*H02K 16/00* (2006.01)
*H02K 16/02* (2006.01)

(52) U.S. Cl. ............ 475/5; 475/149; 475/207; 310/114

(58) Field of Classification Search ........ 475/151; 310/124, 101
See application file for complete search history.

(56) References Cited

U.S. PATENT DOCUMENTS

| 5,643,131 | A | 7/1997 | Kuhn et al. |
| 5,675,203 | A | 10/1997 | Schulze et al. |
| 2002/0117922 | A1* | 8/2002 | Kim et al. ............... 310/114 |
| 2003/0162617 | A1* | 8/2003 | Minagawa et al. ........ 475/5 |

FOREIGN PATENT DOCUMENTS

| DE | 43 08 761 C1 | 9/1994 |
| DE | 44 08 719 C1 | 7/1995 |
| DE | 196 29 213 A | 1/1998 |
| DE | 197 28 610 A1 | 2/1999 |
| DE | 101 63 226 A1 | 7/2003 |
| FR | 2 834 938 A | 7/2003 |
| GB | 2 359 670 A | 8/2001 |

* cited by examiner

*Primary Examiner*—Richard M. Lorence
*Assistant Examiner*—Edwin A. Young
(74) *Attorney, Agent, or Firm*—Laurence A. Greenberg; Werner H. Stemer; Ralph E. Locher

(57) ABSTRACT

A continuously variable transmission has a drive shaft, a power takeoff shaft and a power branching device disposed therebetween and has a continuously variable power branch containing a variator, and a mechanical power branch parallel thereto. To provide a large adjustment range and a high level of efficiency in conjunction with a simple and space-saving configuration, the variator is an electromagnetic transmission with a rotatably mounted drive rotor connected to an input shaft, a rotatably mounted power takeoff rotor connected to an output shaft, and a stator connected fixed in terms of rotation and mounted axially displaceably. The rotors have permanent magnets which are each distributed circumferentially axially adjacent to one another and have alternating polarity. The stator has at least one short-circuit winding disposed radially adjacent to the permanent magnets and the effective transmission ratio being adjustable by axial displacement of the stator relative to the rotors.

14 Claims, 2 Drawing Sheets

CONTINUOUSLY VARIABLE TRANSMISSION

CROSS-REFERENCE TO RELATED APPLICATION

This application claims the priority, under 35 U.S.C. §119, of German application DE 10 2005 046 531.5, filed Sep. 28, 2005; the prior application is herewith incorporated by reference in its entirety.

BACKGROUND OF THE INVENTION

Field of the Invention

The invention relates to a continuously variable transmission, in particular of a motor vehicle, having a drive shaft, a power takeoff shaft and a power branching device which is located between them and has a continuously variable power branch containing a variator, and a mechanical power branch parallel thereto.

In a motor vehicle with a drive motor which is embodied as an internal combustion engine, a continuously variable transmission permits optimum adaptation of the drive train to the instantaneous driving situation, in particular it permits a transmission ratio to be set in order to operate the drive motor at a rotational speed which is favorable in terms of fuel consumption. Continuously variable transmissions have hitherto essentially become known, and also been implemented, as mechanical transmissions with friction-supported transmission of torque, such as, for example, the belt and pulley type transmission or the toroidal friction gear transmission.

However, such continuously variable transmissions have a relatively poor level of efficiency compared to a multi-step transmission. Likewise, the maximum transmission ratio which can be set is finite, which, as in multi-step transmissions, needs a starter element, for example a friction clutch, necessary for starting. Furthermore, a helical transmission for permitting reverse travel is necessary since due to their construction, these transmissions do not contain a direction of rotation reversing capability. Owing to the restricted spread, i.e. the ratio between the largest transmission ratio and smallest transmission ratio, of such a transmission, a plurality of driving ranges are also frequently provided in corresponding motor vehicles and can be shifted by an additional change-speed gearbox. Likewise, owing to the transmission of torque on the basis of friction, a complicated control of the contact pressure forces is necessary in these transmissions, and such control should take place proportionally to the input torque and as a function of the transmission ratio which is set in such a way that, on the one hand, frictional slip, which would lead to thermal destruction of the components involved, and on the other hand a high level of excess pressure, which would lead to severe mechanical stressing of the components and to a reduction in the efficiency of the transmission, are avoided.

In order to improve the efficiency level of a continuously variable transmission, it has been known for a long time to use the abovementioned configurations of continuously variable transmissions in each case a variator within a transmission arrangement with a power branching device parallel to a mechanical power branch. In this case, the input power is divided between the continuously adjustable power branch and the mechanical power branch, which gives an overall improvement in efficiency. However, a disadvantage here is the associated restriction on the effective adjustment range of the variator.

German Patent DE 43 08 761 C1, corresponding to U.S. Pat. No. 5,643,131, discloses, for example, a continuously variable transmission with a power branching device, in which transmission a gearbox of the belt and pulley type is used as the variator. The input power is distributed at the input end from the drive shaft to the two power branches via a distributor gearbox which is embodied as a planetary gearbox, and the power is combined again at the output end by pairs of toothed wheels on the output shaft. In order to shift two transmission ratio ranges, a first transmission ratio range with power branching and a second transmission ratio range without power branching, two pairs of clutches are provided which each have to be closed alternately. This known transmission is relatively complex in construction and takes up a large installation space owing to the plurality of transmission shafts which are arranged in parallel.

Published, non-prosecuted German patent application DE 197 28 610 A1 discloses a similar continuously variable transmission with power branching, in which a transmission of the belt and pulley type is likewise used as a variator. At the input end the input power is branched off directly from the drive shaft by virtue of the fact that both the input pulley pair of the variator and the drive wheel of a cylindrical gearbox are connected fixed in terms of rotation to the drive shaft. At the output end, the two power branches are combined again by a summing gearbox which is embodied as a planetary gearbox. In order to shift two driving ranges, a slow driving range with power branching and a fast driving range without power branching, two clutches, which have to be closed alternately, are disposed on the planetary gearbox. A gearwheel pair for forward travel which can be shifted by a first clutch and a helical gearbox which can be shifted by a second clutch are connected upstream of the continuously variable gearbox, the clutches also being provided as starting elements. This known transmission is also relatively complicated to construct and requires a large installation space.

A continuously variable transmission with power branching in which a toroidal friction gear transmission is used as the variator is described in published, non-prosecuted German patent application DE 196 29 213 A1. The input power is first transmitted via a pair of gearwheels to a countershaft and branched from there via a chain drive to the toroidal friction gearbox. At the output end, the two power branches of the variator and the countershaft, downstream of each of which a speed-changing transmission stage with a fixed transmission ratio is connected, are combined by a summing gearbox which is embodied as a planetary gearbox. In order to shift two driving ranges, a slow driving range with power branching and a fast driving range without power branching, one clutch is disposed on the countershaft and one on the planetary gearbox, respectively, the clutches having to be closed alternately in order to shift driving ranges. This known transmission is also complicated and has relatively large axial and radial dimensions.

In contrast, a completely different configuration of a continuously variable transmission is known from German patent DE 44 08 719 C1, corresponding to U.S. Pat. No. 5,675,203, and one with an identical physical function but with a different geometric design is known from published, non-prosecuted German patent application DE 101 63 226 A1. This is an electromagnetic transmission in which the input power, i.e. the input speed and the input torque, are converted electromagnetically, with the effective transmission ratio being transmitted by the axial position of at least one short-circuit winding disposed on the stator with respect to the permanent magnets disposed on the drive rotor and the power takeoff rotor. While having a compact configuration, this transmission advantageously has a transmission ratio range from infinite to zero including reversal of the direction of rotation and therefore does not require either a starting element or a helical gearbox when it is used as a transmission for a motor vehicle. However, when relatively large torques are transmitted it may be disadvantageous that the high induced electrical currents as a result of this give rise to high ohmic losses and consequently to reduced efficiency of the transmission given a finite line cross section of the short-circuit winding. In order to limit the ohmic losses, for example a cooling system with a coolant circuit which leads past near to the short-circuit winding and which contains a pump and a radiator could be provided, for example, but this would not require additional expenditure.

SUMMARY OF THE INVENTION

It is accordingly an object of the invention to provide a continuously variable transmission that overcomes the above-mentioned disadvantages of the prior art devices of this general type, which has a simple and space-saving configuration while at the same time having a large adjustment range and a high level of efficiency.

With the foregoing and other objects in view there is provided, in accordance with the invention, a continuously variable transmission. The transmission contains a drive shaft, a power takeoff shaft, and a power branching device disposed between the drive shaft and the power takeoff shaft. The power branching device has a continuously variable power branch with a variator, and a mechanical power branch parallel thereto. The variator is an electromagnetic transmission having a housing component, an input shaft, an output shaft, a rotatably mounted drive rotor connected to the input shaft, a rotatably mounted power takeoff rotor connected to the output shaft, and a stator connected fixed in terms of rotation and mounted axially displaceably to the housing component. The drive rotor and the power takeoff rotor have permanent magnets each distributed circumferentially axially adjacent to one another in a cylindrical configuration and have alternating polarity. The stator has at least one short-circuit winding disposed radially adjacent to the permanent magnets and connectable to an assigned electronic control system. An effective transmission ratio is adjustable by axial displacement of the stator relative to the drive rotor and the power takeoff rotor.

The problem is solved according to the invention in that the variator is embodied as an electromagnetic transmission with a rotatably mounted drive rotor which is connected as required to an input shaft, a rotatably mounted power takeoff rotor which is connected as required to an output shaft, and a stator which is connected fixed in terms of rotation and mounted axially displaceably to a housing component. The drive rotor and the power takeoff rotor have permanent magnets which are each distributed circumferentially axially adjacent to one another in a cylindrical configuration and have alternating polarity. The stator has at least one short-circuit winding which is disposed radially adjacent to the permanent magnets of the rotors and is connected to an assigned electronic control system, the effective transmission ratio being adjustable by axial displacement of the stator relative to the rotors.

As a result of the branching of the power, only a fraction of the drive power present at the drive shaft is now transmitted via the variator, as a result of which the efficiency of the entire transmission is increased. In this context, the electromagnetic transmission is, owing to its large adjustment range in contrast to other configurations of continuously variable transmissions such as the belt and pulley type transmission and the toroidal friction gear transmission, particularly suitable as a variator since as a result the limitation of the adjustment range of the entire transmission, caused by the power branching, has virtually no disadvantageous effect. Given a corresponding configuration of the power branching, the capability of the electromagnetic transmission to start up from a stationary state and to reverse the direction of rotation for the entire transmission can be retained and thus a starting element and a helical gearbox can be omitted or dispensed with.

The electromagnetic transmission which is used as a variator can, as is known from German patent DE 44 08 719 C1 and published, non-prosecuted German patent application DE 101 63 226 A1, be embodied as an external rotor unit in which the stator is disposed radially on the inside, the short-circuit winding is disposed radially on the outside of the stator, the drive rotor and the power takeoff rotor are disposed radially on the outside, and the permanent magnets are disposed on the rotors on the radially inner side facing the short-circuit winding.

However, the respective electromagnetic transmission can also be embodied as an internal rotor unit with a radially external stator and with radially internal rotors, in which transmission the short-circuit winding is disposed radially on the inside of the stator, and the permanent magnets are disposed on the rotors on the radially outer side facing the short-circuit winding.

The power branching device can be formed by a drive-end distributor gearbox with an input element and two output elements, the input element of which distributor gearbox is connected fixed in terms of rotation to the drive shaft and whose first output element is connected fixed in terms of rotation to the input shaft or directly to the drive rotor of the electromagnetic transmission, and whose second output element is connected fixed in terms of rotation to the power takeoff shaft.

Here, the use of a simple planetary gearbox with a sun wheel, with a plurality of planet wheels which are rotatably mounted on a planet carrier and are engaged by toothing with the sun wheel, and with a ring gear, which is engaged by toothing with the planet wheels of the planet carrier, as a distributor gearbox is particularly advantageous since this configuration of the gearbox has particularly compact dimensions and enables a coaxial arrangement of all the components of the two power branches and thus compact dimensions of the entire gearbox.

In order to reduce the transmission of power further by the variator, the output shaft or the power takeoff rotor of the electromagnetic transmission can be connected to the power takeoff shaft by a speed-changing transmission stage with a fixed transmission ratio. The speed-changing transmission stage being able to be embodied in turn as a simple planetary gearbox with a component (sun wheel, planet carrier or ring gear) which is fixed to the housing or else as a cylindrical gearing of the reduction gearing design with two pairs of gearwheels.

Alternatively, the power branching device can also be formed by a power takeoff-end summing gearbox with two input elements and an output element whose first input element is connected fixed in terms of rotation to the output shaft or directly to the power takeoff rotor of the electromagnetic transmission and whose second input element is connected fixed in terms of rotation to the drive shaft and whose output element is connected fixed in terms of rotation to the power takeoff shaft.

For the above-mentioned reasons, a simple planetary gearbox with a sun wheel, with a plurality of planet wheels which are rotatably mounted on a planet carrier and are engaged by toothing with the sun wheel, and with a ring gear which is engaged by toothing with the planet wheels of the planet carrier is also preferably once more used as the summing gearbox.

In this embodiment of the power branching device it is also possible to provide an additional speed-changing transmission stage with a fixed transmission ratio for further reducing the transmission of power via the variator, the input shaft or the drive rotor of the electromagnetic transmission being connected to the drive shaft by the speed-changing transmission stage, with an embodiment as a simple planetary gearbox with a component which is fixed to the housing or as a cylindrical gearing of the reduction type being possible.

The described configuration features permit a multiplicity of embodiments of the continuously variable transmission according to the invention. The following description of a number of selected exemplary embodiments therefore presents just some of the possible embodiments claimed with the present patent application and is therefore not to be considered as being restrictive of the scope of protection of this patent application.

In a first preferred embodiment of the continuously variable transmission according to the invention, an electromagnetic transmission which is embodied as an external rotor unit and which is based on the embodiment according to German patent DE 44 08 719 C1 is provided as a variator, and a simple planetary gearbox is provided as the drive-end distributor gearbox. The planetary gearbox forms the input element and is connected fixed in terms of rotation to the drive shaft. The ring gear is provided as a first output element and is connected fixed in terms of rotation directly to the drive rotor of the electromagnetic transmission. The sun wheel forms the second output element and is connected fixed in terms of rotation to the power takeoff shaft. The power takeoff rotor of the electromagnetic transmission is connected fixed in terms of rotation to the power takeoff shaft, and the power takeoff shaft is made to extend centrally through a central bore in the stator as far as the sun wheel.

In a second preferred embodiment of the continuously variable transmission according to the invention, an electromagnetic transmission which is embodied as an external rotor unit and which is based on the embodiment according to published, non-prosecuted German patent application DE 101 63 226 A1 is provided as the variator, and a simple planetary gearbox is provided as the drive-end distributor gearbox. The planet carrier forms the input element and is connected fixed in terms of rotation to the drive shaft. The sun wheel is provided as the first output element and is connected fixed in terms of rotation to the input shaft of the electromagnetic transmission. The ring gear forms the second output element and is connected fixed in terms of rotation to the power takeoff shaft via the power takeoff rotor of the electromagnetic transmission.

In a further preferred embodiment of the continuously variable transmission according to the invention, an electromagnetic transmission which is embodied as an external rotor unit and which is based on the embodiment according to published, non-prosecuted German patent application DE 101 63 226 A1 is provided as the variator and a simple planetary gearbox is provided as the power takeoff-end summing gearbox. The ring gear forms the first input element and is connected fixed in terms of rotation directly to the power takeoff rotor of the electromagnetic transmission. The planet carrier is provided as a second input element and is connected fixed in terms of rotation directly to the drive shaft via the drive rotor of the electromagnetic transmission. The sun wheel forms the output element and is connected fixed in terms of rotation to the power takeoff shaft.

In a fourth preferred embodiment of the continuously variable transmission according to the invention, an electromagnetic transmission, which is embodied as an internal rotor unit, is provided as the variator, and a simple planetary gearbox is provided as the drive-end distributor gearbox. The ring gear forms the input element and is connected fixed in terms of rotation to the drive shaft. The sun wheel is provided as a first output element and is connected fixed in terms of rotation to the input shaft of the electromagnetic transmission. The planet carrier forms the second output element and is connected fixed in terms of rotation to the power takeoff shaft. The output shaft of the electromagnetic transmission is connected to the power takeoff shaft via an additional speed-changing transmission stage, and the power takeoff shaft is made to extend centrally through a central bore in the power takeoff rotor and the output shaft as well as through a central bore in the drive rotor and the input shaft of the electromagnetic transmission as far as the planet carrier.

Other features which are considered as characteristic for the invention are set forth in the appended claims.

Although the invention is illustrated and described herein as embodied in a continuously variable transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
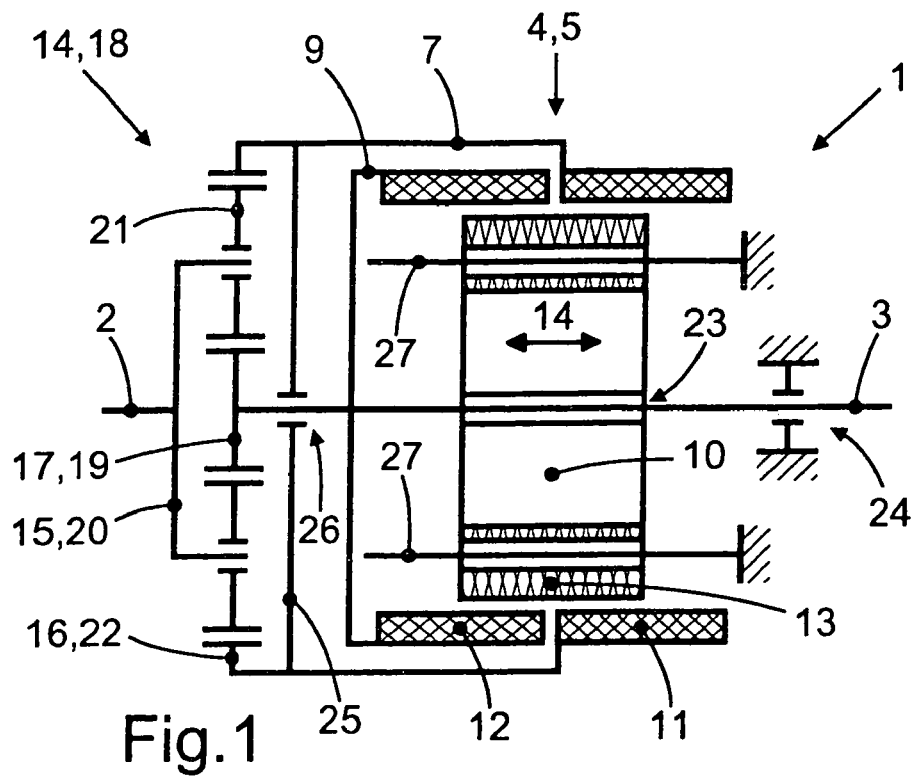
FIG. 1 is a diagrammatic, longitudinal central sectional view of a first embodiment of a continuously variable transmission according to the invention.

Referring now to the figures of the drawing in detail and first, particularly, to FIGS. 1 to 4 thereof, there is shown a continuously variable transmission 1 that has a drive shaft 2, a power takeoff shaft 3 and a power branching device which is located between them and has a continuously variable power branch containing a variator 4, and a mechanical power branch which is parallel thereto. The variator 4 is embodied as an electromagnetic transmission 5 with a rotatably mounted drive rotor 7 which is connected to an input shaft 6, a rotatably mounted power takeoff rotor 9 which is connected to an output shaft 8, and an axially displaceably mounted stator 10 which is connected fixed in term of rotation to a housing component. The drive rotor 7 and the power takeoff rotor 9 have permanent magnets 11, 12 which are each distributed circumferentially axially adjacent to one another in a cylindrical configuration and have alternating polarity. The stator 10 has at least one short-circuit winding 13 which is disposed radially adjacent to the permanent magnets 11, 12 of the rotors 7, 9 and is connected to an assigned electronic control system. The effective transmission ratio of the variator 4, and thus of the entire transmission 1, can be adjusted by an axial displacement 14 of the stator 10 relative to the rotors 7, 9, with which an improved level of efficiency of the transmission 1 is achieved by the power branching.

In a first embodiment of the continuously variable transmission 1 according to FIG. 1, the electromagnetic transmission 5 which is effective as the variator 4 is embodied as an external rotor unit with a radially internal stator 10 and with radially external rotors 7, 9. The short-circuit winding 13 is disposed radially on the outside of the stator 10, and the permanent magnets 11, 12 are disposed radially on the inside of the rotors 7, 9 facing the short-circuit winding 13. For the purpose of power branching, a drive-end distributor gearbox 14 is provided with an input element 15 and two output elements 16, 17. The distributor gearbox 14 is embodied here as a simple planetary gearbox 18 with a sun wheel 19, a plurality of planet wheels 21 which are rotatably mounted on a planet carrier 20 and are engaged by toothing with the sun wheel 19, and a ring gear 22 which is engaged by toothing with the planet wheels 21. The planet carrier 20 forms the input element 15 and is connected fixed in terms of rotation to the drive shaft 2. The ring gear 22 is provided as a first output element 16 and is connected fixed in terms of rotation directly to the drive rotor 7 of the electromagnetic transmission 5 which extends over the power takeoff rotor 9 radially on the outside. The sun wheel 19 forms the second output element 17 and is connected fixed in terms of rotation to the power takeoff shaft 3 which is made to extend centrally through a central bore 23 of the stator 10 as far as the sun wheel 19. The power takeoff rotor 9 of the electromagnetic transmission 5 is connected fixed in terms of rotation to the power takeoff shaft 3 which is rotatably mounted at the power takeoff end by a radial bearing 24 in a housing component. The drive rotor 7 is rotatably mounted at the drive end by a bearing wheel 25 and a further radial bearing 26 on the power takeoff shaft 3. The stator 10 is mounted so as to be fixed in terms of rotation and axially displaceable by a plurality of guide rails 27 which are fixed to the housing.

Figure 2:
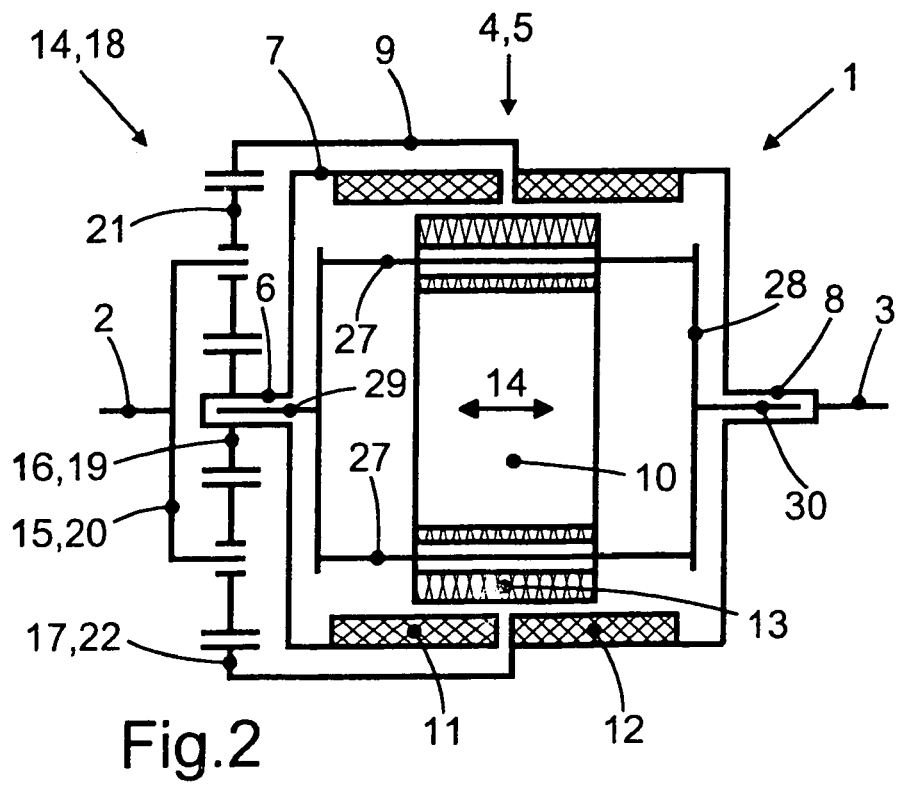
FIG. 2 is a diagrammatic, longitudinal central sectional view of a second embodiment of the continuously variable transmission according to the invention.

In a second embodiment of the continuously variable transmission 1 according to FIG. 2, the electromagnetic transmission 5 which is effective as the variator 4 is also embodied as an external rotor unit with the radially internal stator 10 and with radial external rotors 7, 9. Accordingly, the short-circuit winding 13 and the permanent magnets 11, 12 are in principle disposed on the stator 10 and on the rotors 7, 9 in the way previously described for the first embodiment. However, it is worth mentioning that the axial arrangement of the permanent magnets 11, 12 is now interchanged compared to the first embodiment. For the purpose of power branching, again the drive-end distributor gearbox 14 which is embodied as a simple planetary gearbox 18 is provided. In this embodiment, the planet carrier 20 also forms the input element 15 of the distributor gearbox 14 and is connected fixed in terms of rotation to the drive shaft 2. However, the sun wheel 19 is now provided as the first output element 16 of the distributor gearbox 14 and is connected fixed in terms of rotation to the input shaft 6 of the electromagnetic transmission 5. The ring gear 22 forms the second output element 17 and is connected fixed in terms of rotation to the power takeoff shaft 3 via the power takeoff rotor 9 which extends over the drive rotor 7 radially on the outside. The drive rotor 7 and the power takeoff rotor 9 are each rotatably mounted on a drive-end bearing bolt 29 or power takeoff-end bearing bolt 30 attached to a frame 28 fixed to the housing. The stator 10 is mounted in a rotationally fixed and axially displaceable fashion by the plurality of guide rails 27 which are attached to the frame 28.

Figure 3:
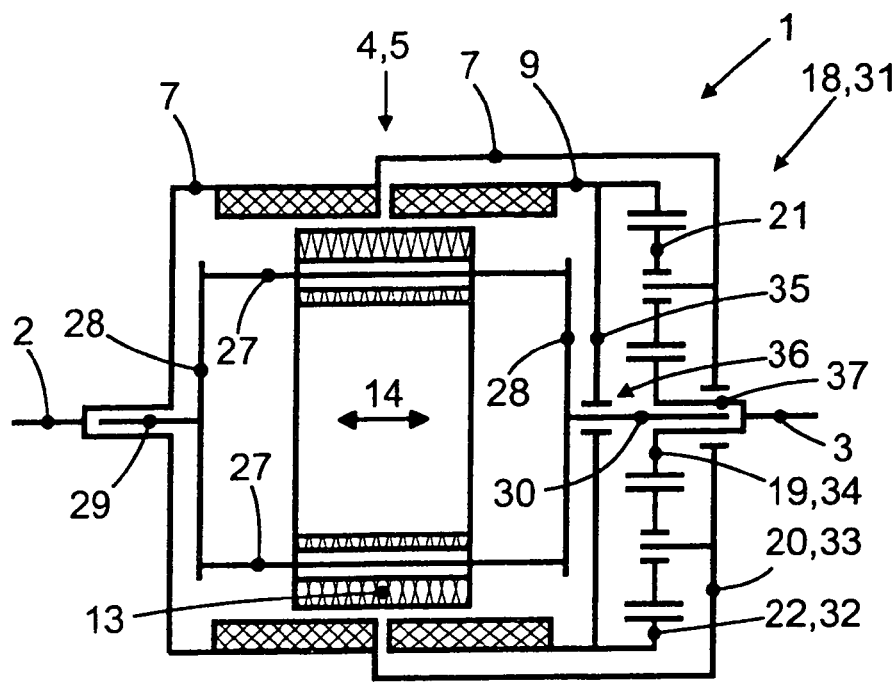
FIG. 3 is a diagrammatic, longitudinal central sectional view of a third embodiment of the continuously variable transmission according to the invention.

In a third embodiment of the continuously variable transmission 1 according to FIG. 3, the electromagnetic transmission 5 which is effective as the variator 4 is embodied in a largely identical way to that in the second embodiment according to FIG. 2. However, in this embodiment, for the purpose of power branching, a power takeoff-end summing gearbox 31 with two input elements 32, 33 and an output element 34 is provided. The summing gearbox 31 is again embodied as a simple planetary gearbox 18 with the sun wheel 19, a plurality of planet wheels 21 which are rotatably mounted on the planet carrier 20 and are engaged by toothing with the sun wheel 19, and a ring gear 22 which is engaged by toothing with the planet wheels 21. The ring gear 22 forms the first input element 32 and is connected fixed in terms of rotation directly to the power takeoff rotor 9 of the electromagnetic transmission 5. The planet carrier 20 is provided as a second input element 33 and is connected fixed in terms of rotation to the drive shaft 2 via the drive rotor 7 which extends over the power takeoff rotor 9 radially on the outside. The sun wheel 19 forms the output element 34 and is connected fixed in terms of rotation to the power takeoff shaft 3. The drive rotor 7 and the power takeoff rotor 9 are each rotatably mounted on a drive-end or power takeoff-end bearing bolt 29, 30 which is attached to the frame 28 fixed to the housing, the power takeoff rotor 9 having for this purpose a special bearing wheel 35 with a radial bearing 36. The sun wheel 19 has a bearing stem 37 with which it is also rotatably mounted on the power takeoff-end bearing bolt 30 and on which the planet carrier 20 is rotatably supported radially on the outside.

Figure 4:
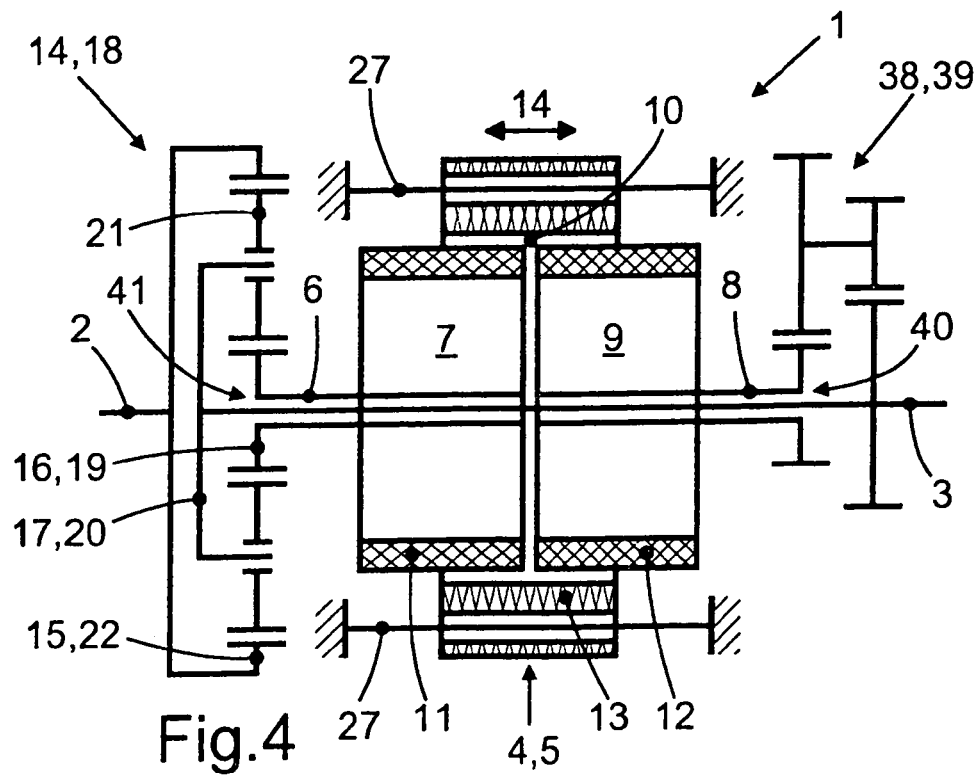
FIG. 4 is a diagrammatic, longitudinal central sectional view of a fourth embodiment of the continuously variable transmission according to the invention.

In contrast to the previously described embodiments, in a fourth embodiment of the continuously variable transmission 1 according to FIG. 4 the electromagnetic transmission 5 which is effective as the variator 4 is embodied with basically the same method of operation as an internal rotor unit with a radially external stator 20 which is of hollow cylindrical configuration, and with radially internal rotors 7, 9. The short-circuit winding 13 is then disposed radially on the inside of the stator 10, and the permanent magnets 11, 12 are disposed radially on the outside of the rotors 7, 9 facing the short-circuit winding 13. For power branching, a drive-end distributor gearbox 14 with an input element 15 and two output elements 16, 17 is again provided. The distributor gearbox 14 is embodied again as a simple planetary gearbox 18 here. The ring gear 22 forms the input element 15 and is connected fixed in terms of rotation to the drive shaft 2. The sun wheel 19 is provided as a first output element 16 and is connected fixed in terms of rotation to the input shaft 6 of the electromagnetic transmission 5. The planet carrier 20 forms the second output element 17 and is connected fixed in terms of rotation to the power takeoff shaft 3. The output shaft 8 of the electromagnetic transmission 5 is connected to the power takeoff shaft 3 via an additional speed-changing transmission stage 38, which is embodied here as a cylindrical gearing 39 of the reduction type. The power takeoff shaft 3 is made to extend centrally through a central bore 40 in the output shaft 8 and in the power takeoff rotor 9 as well as through a central bore 41 in the drive rotor 7 and the input shaft 6 of the electromagnetic transmission 5 as far as the planet carrier 20. The stator 10 is mounted so as to be fixed in terms of rotation and axially displaceable by use the plurality of guide rails 27 fixed to the housing, as in the previously described embodiments.

We claim:

1. A continuously variable transmission, comprising:
a drive shaft;
a power takeoff shaft; and
a power branching device disposed between said drive shaft and said power takeoff shaft, said power branching device having a continuously variable power branch with a variator, and a mechanical power branch parallel thereto, said variator being an electromagnetic transmission having a housing component, an input shaft, an output shaft, a rotatably mounted drive rotor connected to said input shaft, a rotatably mounted power takeoff rotor connected to said output shaft, and a stator connected fixed in terms of rotation and mounted axially displaceably to said housing component, said drive rotor and said power takeoff rotor having permanent magnets each distributed circumferentially axially adjacent to one another in a cylindrical configuration and have alternating polarity, said stator having at least one short-circuit winding disposed radially adjacent to said permanent magnets and connectable to an assigned electronic control system, an effective transmission ratio being adjustable by axial displacement of said stator relative to said drive rotor and said power takeoff rotor.

2. The continuously variable transmission according to claim 1, wherein said electromagnetic transmission is an external rotor unit having said stator being a radially internal stator and said drive rotor and said power takeoff rotor being radially external rotors with a radially inner side, said short-circuit winding being disposed radially on an outside of said stator and said permanent magnets being disposed on said rotors on said radially inner side facing said short-circuit winding.

3. The continuously variable transmission according to claim 1, wherein said electromagnetic transmission is an internal rotor unit having said stator being a radially external stator and said drive rotor and said power takeoff rotors being radially internal rotors, said short-circuit winding being disposed radially on an inside of said stator, and said permanent magnets being disposed on said rotors on a radially outer side facing said short-circuit winding.

4. The continuously variable transmission according to claim 1, wherein said power branching device includes a drive-end distributor gearbox having an input element and first and second output elements, said input element of said distributor gearbox is connected fixed in terms of rotation to said drive shaft and said first output element is connected fixed in terms of rotation to said input shaft or directly to said drive rotor of said electromagnetic transmission, and said second output element is connected fixed in terms of rotation to said power takeoff shaft.

5. The continuously variable transmission according to claim 4, wherein said distributor gearbox is a planetary gearbox with a sun wheel, a planet carrier, and a plurality of planet wheels which are rotatably mounted on said planet carrier and have toothing for engaging with said wheel, said planetary gearbox further having a ring gear with toothing for engaging with said planet wheels of said planet carrier.

6. The continuously variable transmission according to claim 5, further comprising a speed-changing transmission stage, said output shaft or said power takeoff rotor of said electromagnetic transmission is connected to said power takeoff shaft by said speed-changing transmission stage with a fixed transmission ratio.

7. The continuously variable transmission according to claim 6, wherein:
said ring gear is said input element and is connected fixed in terms of rotation to said drive shaft;
said sun wheel is said first output element and is connected fixed in terms of rotation to said input shaft of said electromagnetic transmission;
said planet carrier is said second output element and is connected fixed in terms of rotation to said power takeoff shaft;
said output shaft of said electromagnetic transmission being connected to said power takeoff shaft via said speed-changing transmission stage;
said drive rotor and said input shaft have a common first central bore formed therein; and
said power takeoff rotor and said output shaft have a common second central bore formed therein, said power takeoff shaft being made to extend centrally through said common second central bore in said power takeoff rotor and said output shaft as well as through said common first central bore in said drive rotor and said input shaft of said electromagnetic transmission as far as said planet carrier.

8. The continuously variable transmission according to claim 5, wherein:
said stator has a central bore formed therein;
said planet carrier is said input element and is connected fixed in terms of rotation to said drive shaft;
said ring gear is said first output element and is connected fixed in terms of rotation directly to said drive rotor of said electromagnetic transmission;
said sun wheel is said second output element and is connected fixed in terms of rotation to said power takeoff shaft;
said power takeoff rotor of said electromagnetic transmission is connected fixed in terms of rotation to said power takeoff shaft; and
said power takeoff shaft being made to extend centrally through said central bore in said stator as far as said sun wheel.

9. The continuously variable transmission according to claim 5, wherein:
said planet carrier is said input element and is connected fixed in terms of rotation to said drive shaft;
said sun wheel is said first output element and is connected fixed in terms of rotation to said input shaft of said electromagnetic transmission; and
said ring gear is said second output element and is connected fixed in terms of rotation to said power takeoff shaft via said power takeoff rotor of said electromagnetic transmission.

10. The continuously variable transmission according to claim 1, wherein said power branching device includes a power takeoff-end summing gearbox having first and second input elements and an output element, said first input element is connected fixed in terms of rotation to said output shaft or directly to said power takeoff rotor of said electromagnetic transmission, said second input element is connected fixed in terms of rotation to said drive shaft, and said output element is connected fixed in terms of rotation to said power takeoff shaft.

11. The continuously variable transmission according to claim 10, wherein said summing gearbox includes a planetary gearbox with a sun wheel, a planet carrier, a plurality of planet wheels rotatably mounted on said planet carrier and have toothing for engaging with said sun wheel, and a ring gear which is engaged by said toothing with said planet wheels.

12. The continuously variable transmission according to claim 11, wherein:
- said ring gear is said first input element and is connected fixed in terms of rotation directly to said power takeoff rotor of said electromagnetic transmission;
- said planet carrier is said second input element and is connected fixed in terms of rotation to said drive shaft through said drive rotor of said electromagnetic transmission; and
- said sun wheel is said output element and is connected fixed in terms of rotation to said power takeoff shaft.

13. The continuously variable transmission according to claim 10, further comprising a speed-changing transmission stage, said input shaft or said drive rotor of said electromagnetic transmission is connected to said drive shaft by said speed-changing transmission stage with a fixed transmission ratio.

14. The continuously variable transmission according to claim 1, wherein the continuously variable transmission is configured for use in a motor vehicle.

* * * * *